United States Patent [19]
Narendran

[11] Patent Number: 5,451,772
[45] Date of Patent: Sep. 19, 1995

[54] DISTRIBUTED FIBER OPTIC SENSOR

[75] Inventor: Nadarajah Narendran, Clifton Park, N.Y.

[73] Assignee: Mechanical Technology Incorporated, Latham, N.Y.

[21] Appl. No.: 180,619

[22] Filed: Jan. 13, 1994

[51] Int. Cl.[6] .............................................. G01B 9/02
[52] U.S. Cl. ............................. 250/227.19; 356/352; 250/227.27
[58] Field of Search ...................... 250/227.11, 227.14, 250/227.21, 227.19, 227.27; 356/345, 346, 352

[56] References Cited

U.S. PATENT DOCUMENTS

| | | | |
|---|---|---|---|
| 4,360,272 | 11/1982 | Schmadel et al. | 356/352 |
| 5,157,457 | 10/1992 | Taylor | 250/227.19 |
| 5,202,939 | 4/1993 | Belleville . | |
| 5,276,501 | 1/1994 | McClintock et al. | 250/227.27 |
| 5,301,001 | 4/1994 | Murphy et al. | 250/227.27 |

OTHER PUBLICATIONS

Fiber & Sensor Tehcnologies, Inc. "Optical Fiber Strain Gauge" Performance of a fiber-optic temperature sensor from −200 to 1050 C.

*Primary Examiner*—Edward P. Westin
*Assistant Examiner*—John R. Lee
*Attorney, Agent, or Firm*—Kane, Dalsimer, Sullivan, Kurucz, Levy, Eisele and Richard

[57] ABSTRACT

A distributed optical fiber sensor for sensing physical characteristics of an object, such as strain, includes several discontinuities, each pair of discontinuities being placed at one specific location on the object. A laser beam is past through the fiber and the discontinuities generate components from the beams having parameters indicative of the respective physical characteristics. The components combine in a composite beam which is detected outside the beam and separated into the respective components.

22 Claims, 11 Drawing Sheets

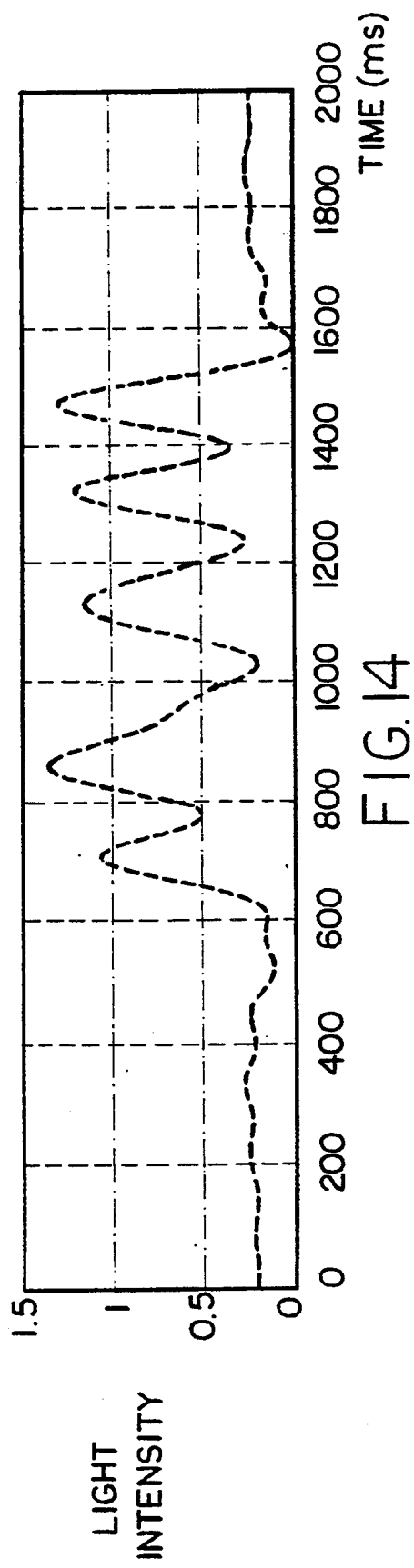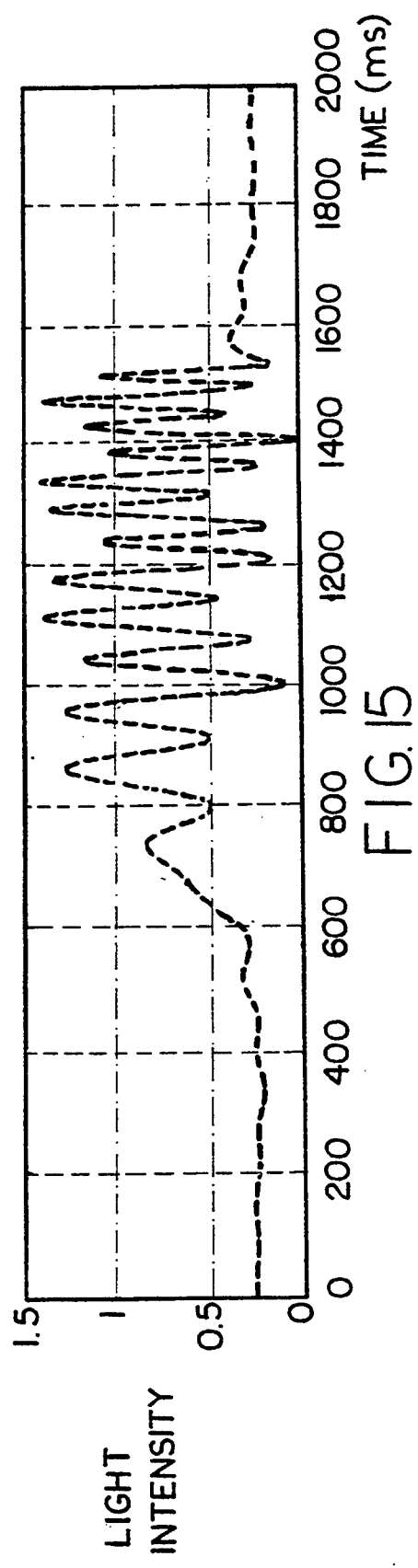

5,451,772

DISTRIBUTED FIBER OPTIC SENSOR

BACKGROUND OF THE INVENTION

A. Field of Invention

This invention pertains to a fiber optic sensor for monitoring strain at several locations independently and more particularly to an optical sensor making use of Fabry-Perot cavities.

B. Description of the Prior Art

In many plants making use of heavy duty equipment, such as for example power utility plants, it is desirable to monitor the status of various rotary and stationary equipment. For example many utility companies are concerned about possible structural and component damages that can lead to catastrophic failure of systems. Thus, the need for real time automatic status monitoring technology in the power plant environment has been growing very rapidly. The ability to sense incipient failures reliably and plan corrective measures in advance can be very cost effective and can reduce or even eliminate power outages. However, currently available sensors are not suited for many of the applications because of the electromagnetic or thermal environments present. In the recent years fiber optic sensors have opened up applications for the sensing of many physical parameters because they possess a variety of advantages over their conventional counterparts. These advantages include a dielectric construction that permits usage in high voltage, electrically noisy, high temperature, corrosive or other hostile environments; geometric versatility that allows arbitrary configurations; and inherent compatibility with fiber optic data links. For example, these characteristics make fiber optic sensors an attractive way to monitor the status of stator end windings and phase connections in large generators by measuring the static and dynamic strain at key locations. Similarly, such fiber optic strain sensors offer advantages for monitoring the status of piping, headers, pressure vessels, boiler tubes, and turbine valves. Thus, the availability of a remote fiber optic strain sensor that can provide information regarding the condition of key structural components may be very beneficial to the utility industry. However even the present optic fiber sensors are difficult to utilize because an individual fiber is required for each sensor, leading to extensive fiber optic connections, elaborate interfaces between the sensors and the data interpreting location and complex data multiplexing schemes.

OBJECTIVES AND SUMMARY OF THE INVENTION

In view of the above-mentioned disadvantages of the prior art, it is an objective of the present invention to provide a single fiber optic sensor for sensing strain at several locations.

A further objective is to provide a sensor which can be used to sense and monitor said parameters reliably using standard data manipulation techniques and equipment.

A further objective is to provide a fiber optic sensor which is relatively inexpensive, easy to tailor to specific needs and easy to install on the equipment. Other objectives and advantages of the invention shall be described in conjunction with the description. Briefly a distributed optical fiber sensor for sensing physical characteristics of an object, such as strain, includes several discontinuities, such as for example FP cavities spaced along the fiber axis. Each discontinuity is placed at one specific location on the object. A laser beam is passed through the fiber and the discontinuities generate components from the beams having parameters indicative of the respective physical characteristics, for example linear time varying strain. The components combine in a composite beam which is detected outside the fiber and are separated into the respective components.

BRIEF DESCRIPTION OF THE DRAWINGS

FIG. 14 shows one component of the response of FIG. 13;

FIG. 15 shows the other component of the response of FIG. 13;

DETAILED DESCRIPTION OF THE INVENTION

Figure 1:
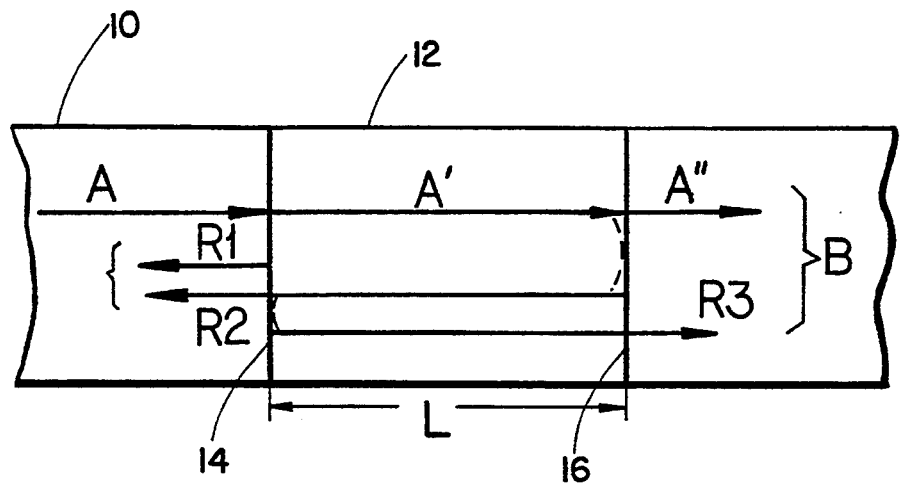
FIG. 1 shows a cross-sectional view of an optical fiber incorporating a Fabry-Perot cavity.

A known optical fiber with a discontinuity, more particularly a Fabry-Perot (FP) cavity, is shown in FIG. 1. Cavity 12 is defined between two surfaces 14, 16 arranged normal to the longitudinal axis of fiber 10. These surfaces are coated with a material which renders them partially reflective. The surfaces are spaced at a predetermined distance L which therefore defines the length of the cavity 12.

Figure 2:
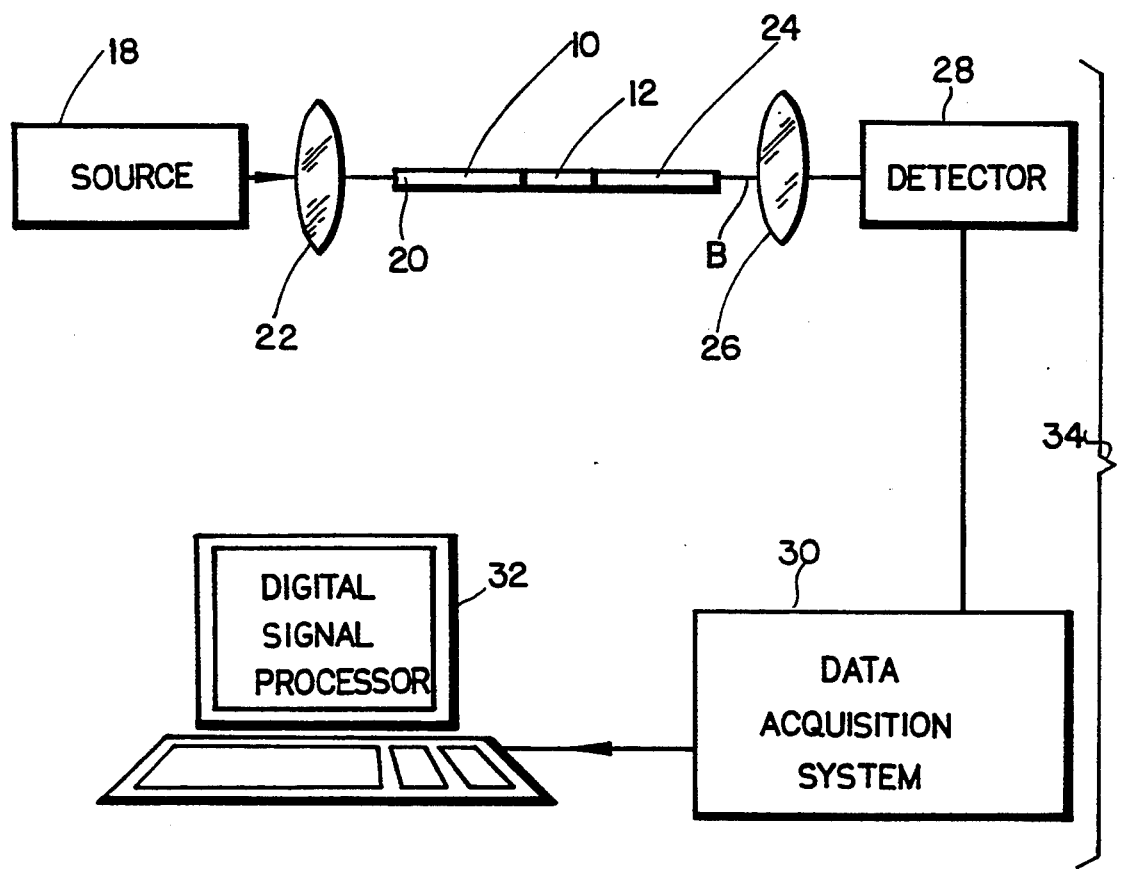
FIG. 2 shows a sensor arranged and constructed to perform measurements using the optical fiber of FIG. 1.

A sensor 34 making use of the fiber 10 is shown in FIG. 2. The sensor 34 also includes a light source such as HE-Ne laser 18 or a laser diode arranged to generate a beam of light directed to enter into one end 20 of fiber 10 through a lens 22.

As shown in FIG. 1, beam A from source 18 passes through the FP cavity 12. A part of the beam, R1, is reflected at surface 14 and the rest, beam A' enters the cavity. A part of beam A', R2, is reflected off surface 16 and travels back towards R1. On exiting the cavity at surface 14 beams R1, and R2 interfere and travel back together toward the proximal end. The rest of beam A', A", is transmitted at surface 16. Part of beam R2, R3, will be reflected off surface 14 and will exit at surface 16. Beams A" and R3 will interfere and the combined beam will travel towards the distal end. The interfered signals can be either detected at the proximal end for remote sensing or at the distal end by focusing the light beam into a detector as described more fully below.

Figure 3:
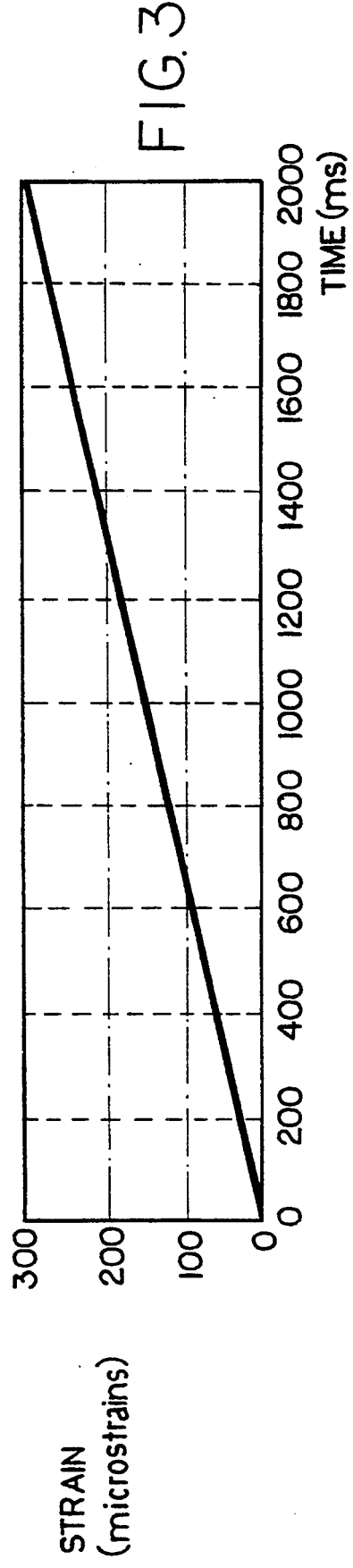
FIG. 3 shows the linear strain applied to the sensor of FIG. 2 as a function of time.
Figure 4:
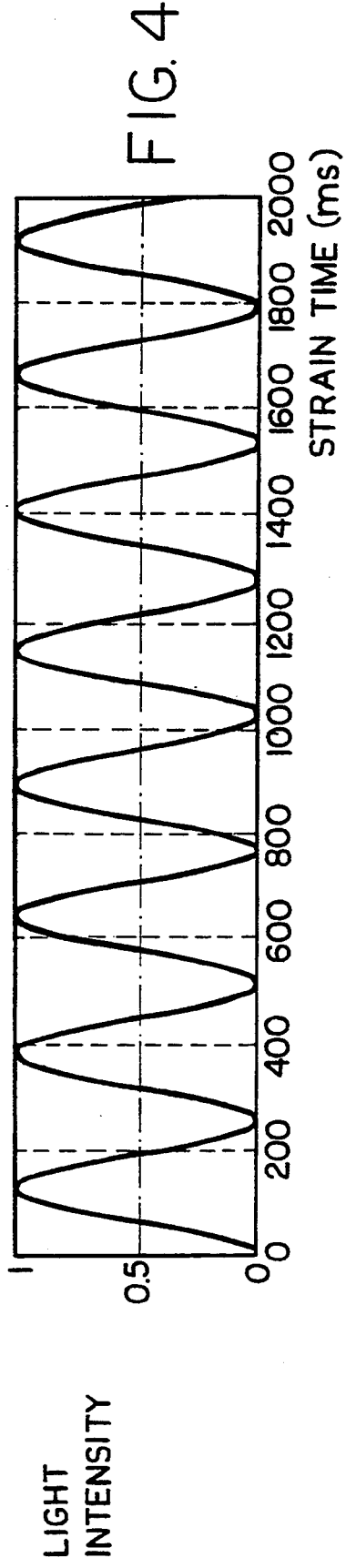
FIG. 4 shows the response of the sensor of FIG. 2 to the strain of FIG. 3.

The sensor operates as follows. Consider a light beam A having a preselected wavelength passing through optical fiber 10 and into cavity 12 of length L. When exposed to a mechanical strain either or both the length and the refractive index of the cavity are changed, resulting in a corresponding change in the beam B. More particularly, if the strain is a linear strain increasing linearly over time as shown in FIG. 3, then the beam B undergoes a cyclical phase shift as illustrated in FIG. 4 in response. The number of cycles exhibited by this phase shifts over a given time period is directly proportional to the rise in strain experienced by fiber 10 and cavity 12.

In FIG. 2 the output beam B is used to monitor strain in fiber 10. However, beam C may be used for the same purpose.

This phase shift is monitored by digital processor 32 through system 30 and detector 28 and the corresponding strain is calculated therefrom. The problem with the sensor of FIGS. 1 and 2 is that it can be used to detect the strain only at a particular location. If several locations need to be monitored, a separate sensor is required for each such parameter and/or location.

Figure 5:
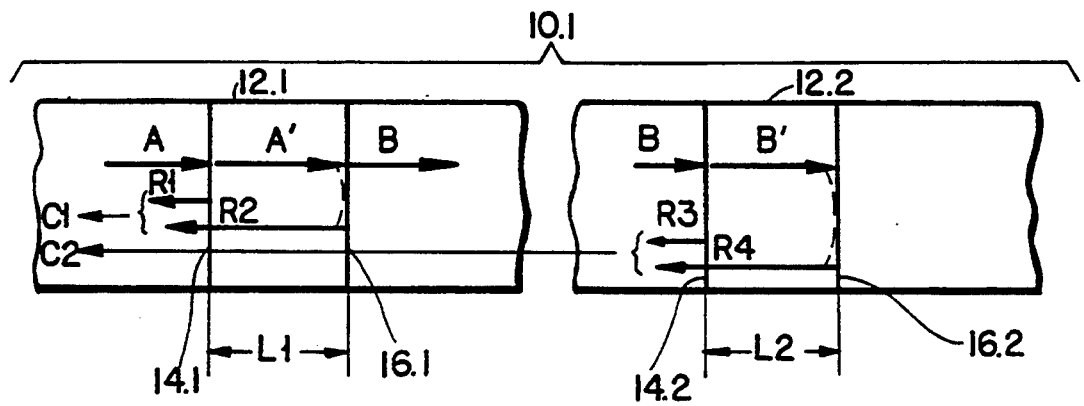
FIG. 5 shows an optical fiber with two cavities constructed in accordance with this invention.
Figure 6:
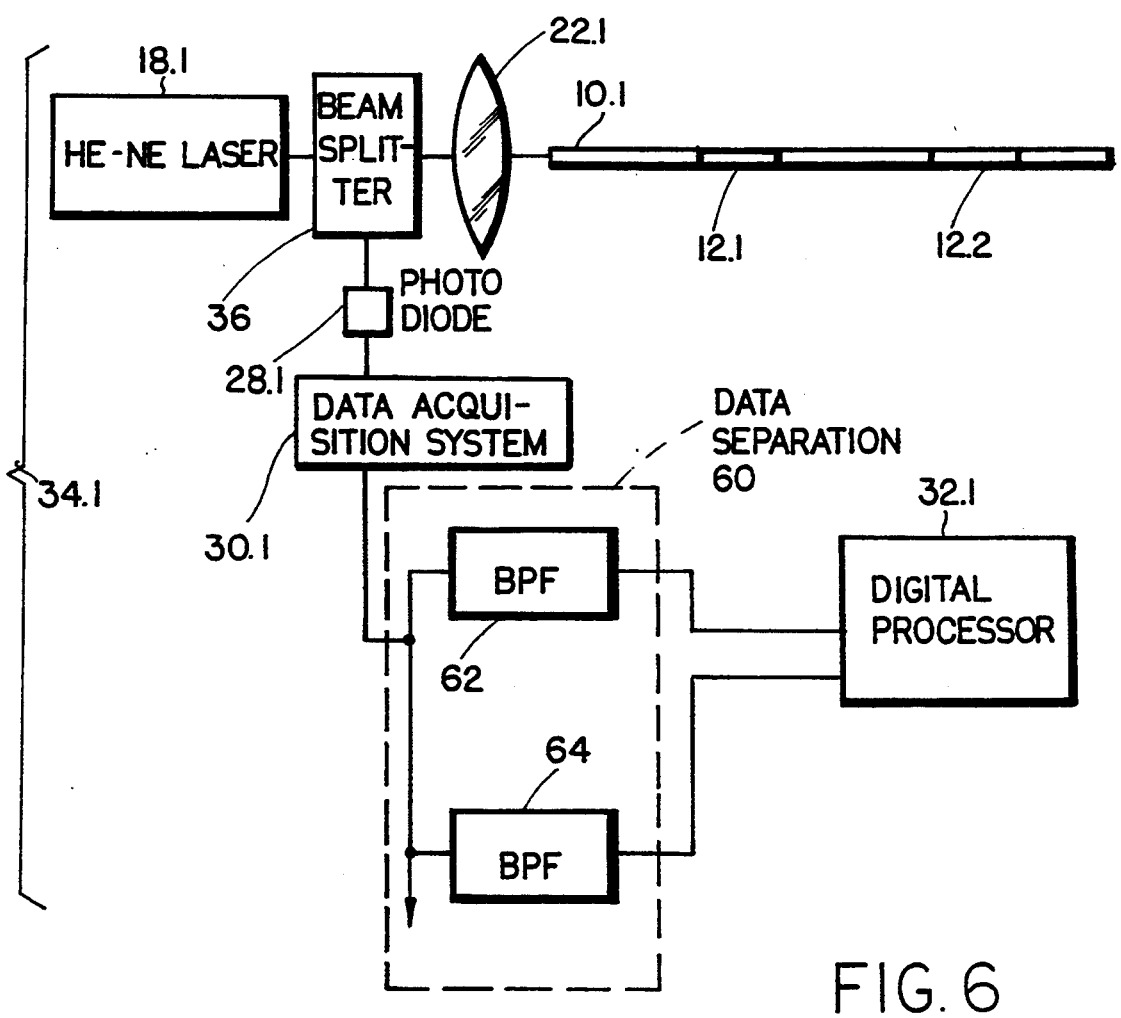
FIG. 6 shows a sensor utilizing a two-cavity optical fiber.

The present inventor has found that several FP cavities can be incorporated into a single fiber for distributed stain measurements by sorting out from the cumulative signal generated within the fiber the different components associated with each cavity. For example as shown in FIGS. 5 and 6, an optical fiber 10.1 can be provided with two FP cavities 12.1 and 12.2 disposed at a preselected distance from each other. Each cavity is defined between two partially reflective surfaces 14.1, 16.1 and 14.2, 16.2 respectively.

As shown in FIG. 5, beam A enters cavity 12.1 which in response generates two reflected beams R1, and R2 from surfaces 14.1 and 16.1 and a transmitted beam B. The transmitted beam B, enters cavity 12.2 and generate two more reflected beam R3, and R4 off the surfaces 14.2 and 16.2. Beams R1 and R2 interfere and give a single beam C1 and beams R3 and R4 interfere to give a single beam C2. Beams C1 and C2 sum up and travel back together to the proximal end.

Figure 7:
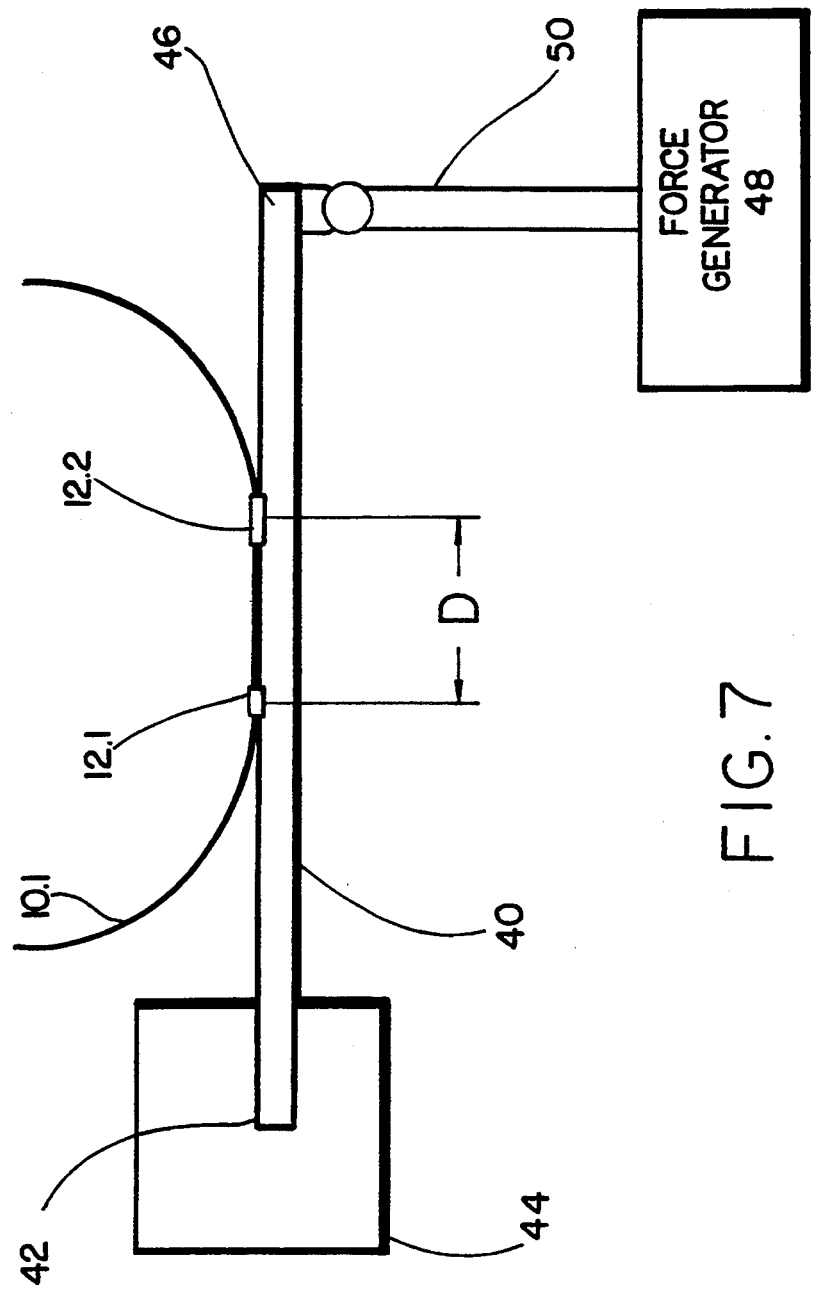
FIG. 7 shows an apparats for calibrating and testing the sensor of FIG. 6.
Figure 8:
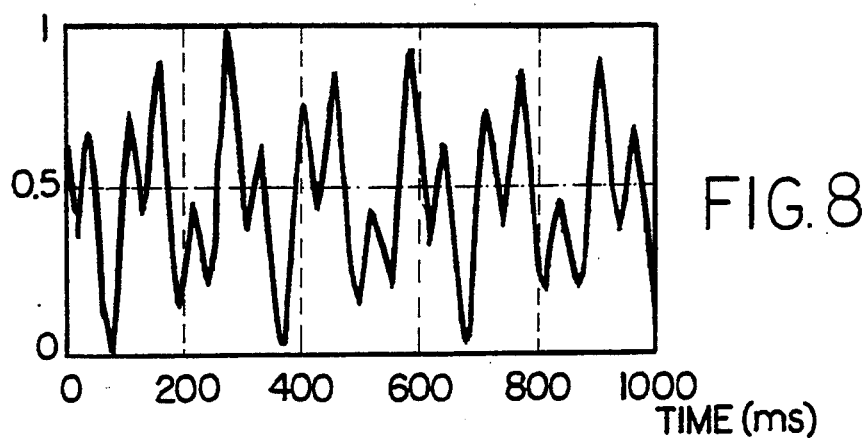
FIG. 8 shows the response of the sensor of FIGS. 6 and 7 as a function of time to the linear strain of FIG. 3.

The sensor 34.1 of FIG. 6 could be used to determine dynamic strain as shown in FIG. 7. In FIG. 7 a cantilevered beam 40 has one end 42 secured to and supported by a stationary frame 44. The opposite end 46 of beam 40 hangs free and unsupported. This end 46 is coupled to a force generator 48 through a coupler 50. Force generator 48 is used to apply a time-variant linear force generating a dynamic strain in beam 40 as shown in FIG. 3.

Figure 10:
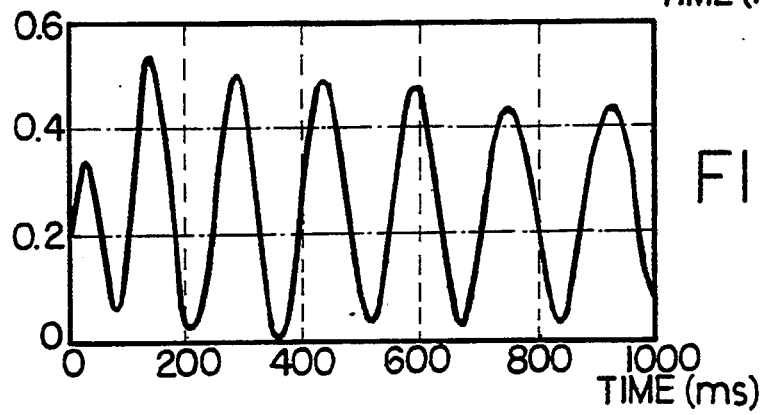
FIG. 10 shows one component of the response of FIG. 8.
Figure 9:
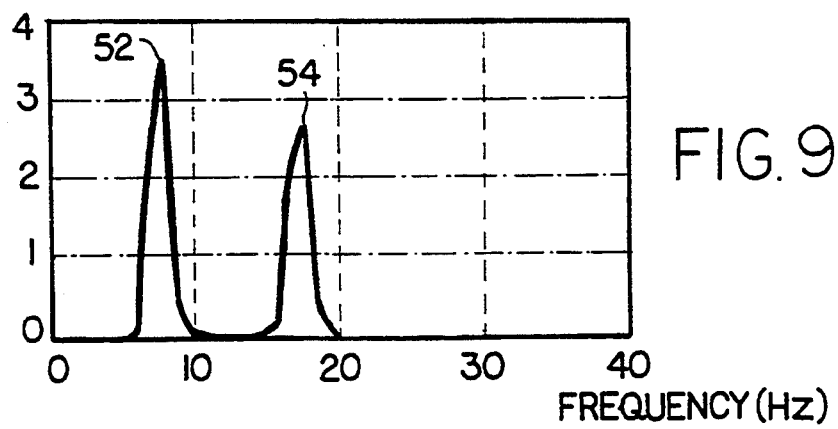
FIG. 9 shows the response of the sensor of FIGS. 6 and 7 in the frequency domain.

Fiber 10.1 is positioned longitudinally on the beam 40 so that its cavities 12.1 and 12.2 are secured to the beam and spaced apart at a preselected distance D. As the beam is bent by the strain from force generator 48, light beam A from source 18.1 (FIG. 6) is modulated by the two cavities 12.1, 12.2. Preferably the two cavities have different lengths L1, L2 as shown in FIG. 5 resulting in two distinct responses. The combined responses to the linear strain are detected at either end of fiber 10.1 and are shown as a function of time in FIG. 9 and in the frequency domain in FIG. 10. Because the cavities 12.1, 12.2 have different lengths, their responses are clearly differentiable. More specifically, response 52 (FIG. 9) is attributable to the shorter cavity, i.e. 12.1 while response 54 is attributable to the longer cavity 12.2.

Figure 11:
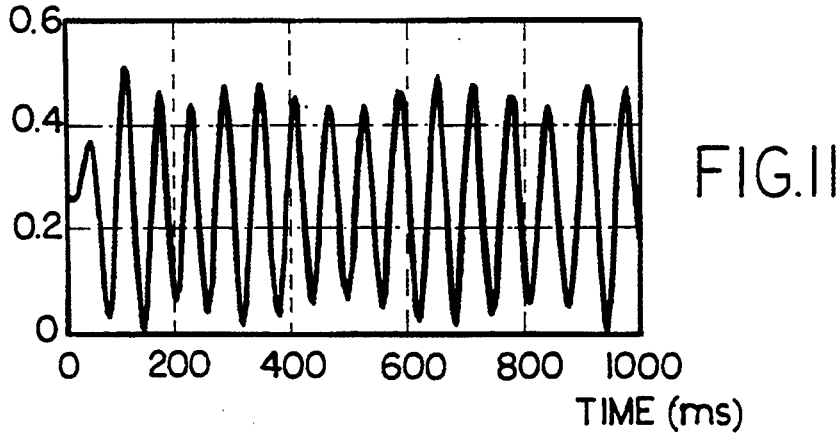
FIG. 11 shows the other component of the response of FIG. 8.

In the configuration of FIG. 6, the reflected beam C1 is used for analysis as opposed to the transmitted beam B analyzed in FIG. 2. As this beam exits from the fiber 10.1 towards source 18.1 it is separated from beam A by beam splitter 38 and is then detected by detector 28.1. The output of detector 28.1 is fed to a digital data acquisition system 30.1. and then to a data separation system 60. In system 60 the individual responses from the cavities 12.1, 12.2 are separated and provided as discrete signals to digital data processor 32.1. The two signals 52, 54 are shown respectively in FIGS. 10 and 11 in the time domain. For example the data separation system 60 may perform an inverse Fourier analysis to accomplish the separation. Alternatively the two responses may be separated two bandpass filters 62, 64 disposed in a parallel as shown. In this manner the data processor receives two discrete signals from the two locations of cavities 12.1. 12.2 using a optical fiber.

Figure 12:
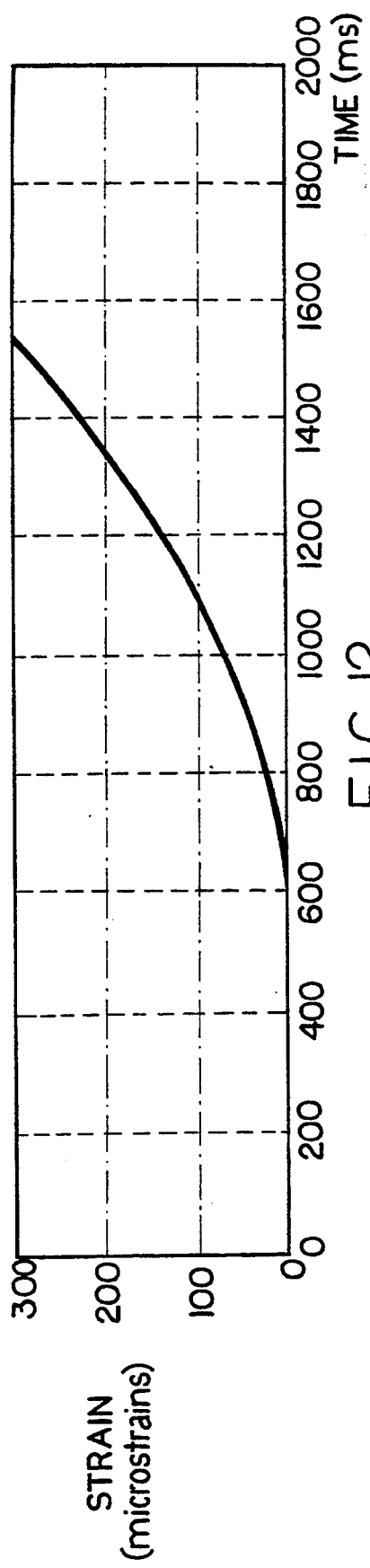
FIG. 12 shows a time dependent profile of quadratic strain.
Figure 13:
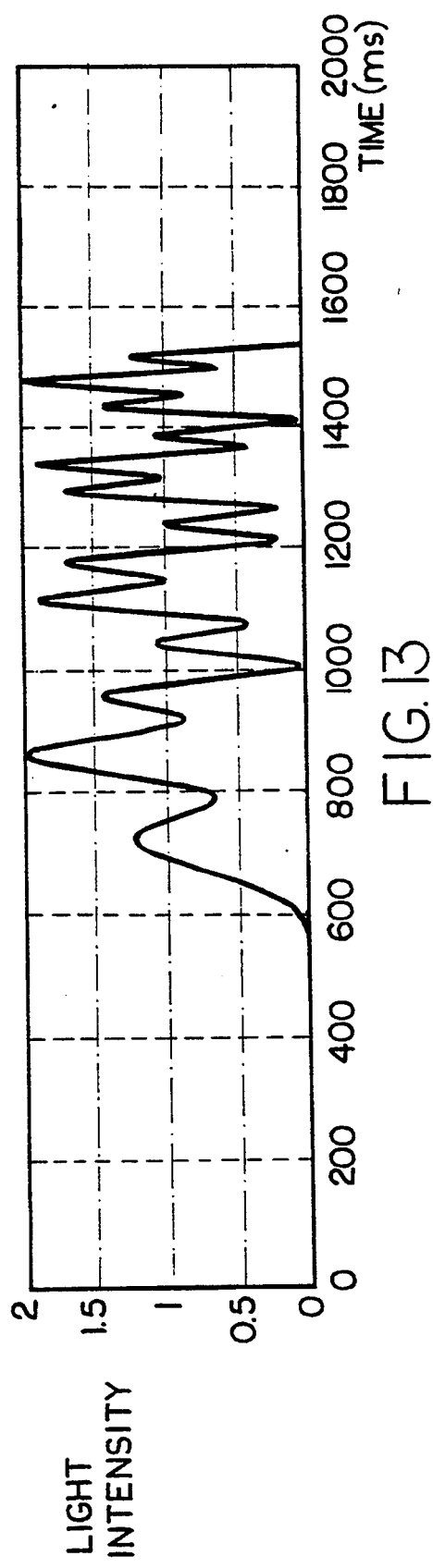
FIG. 13 shows the response of the sensor of FIGS. 6 and 7 to the profile of FIG. 12.

The sensor shown in FIGS. 5-7 may be used to detect other time-dependent characteristics as well. For example, as shown in FIG. 12, the force generator 48 (FIG. 7) may be used to generate a strain within beam 40 which rises parabolically rather than linearly, as a function of time. The composite response C1 from the two cavities 12.1, 12.2 is shown in FIG. 13. Using the same separation system 60 previously discussed, this composite response is then separated into two discrete signals shown in FIGS. 14 and 15. FIG. 14 shows the response of the shorter cavity 12.1 while the FIG. 15 shows the response of the longer cavity 12.2.

In order to differentiate the discrete responses from the cavities even more, the partially reflective surfaces defining one cavity, for instance 14.1, 16.1 may be coated such that they more reflective than the surfaces of the other cavity, i.,e. 14.2, 16.2. As a result the amplitude of the response from the first cavity will be higher than the amplitude from the second cavity. Thus the responses from the two cavities will differ in both phase frequency and amplitude as clearly indicated in FIG. 9.

Figure 16:
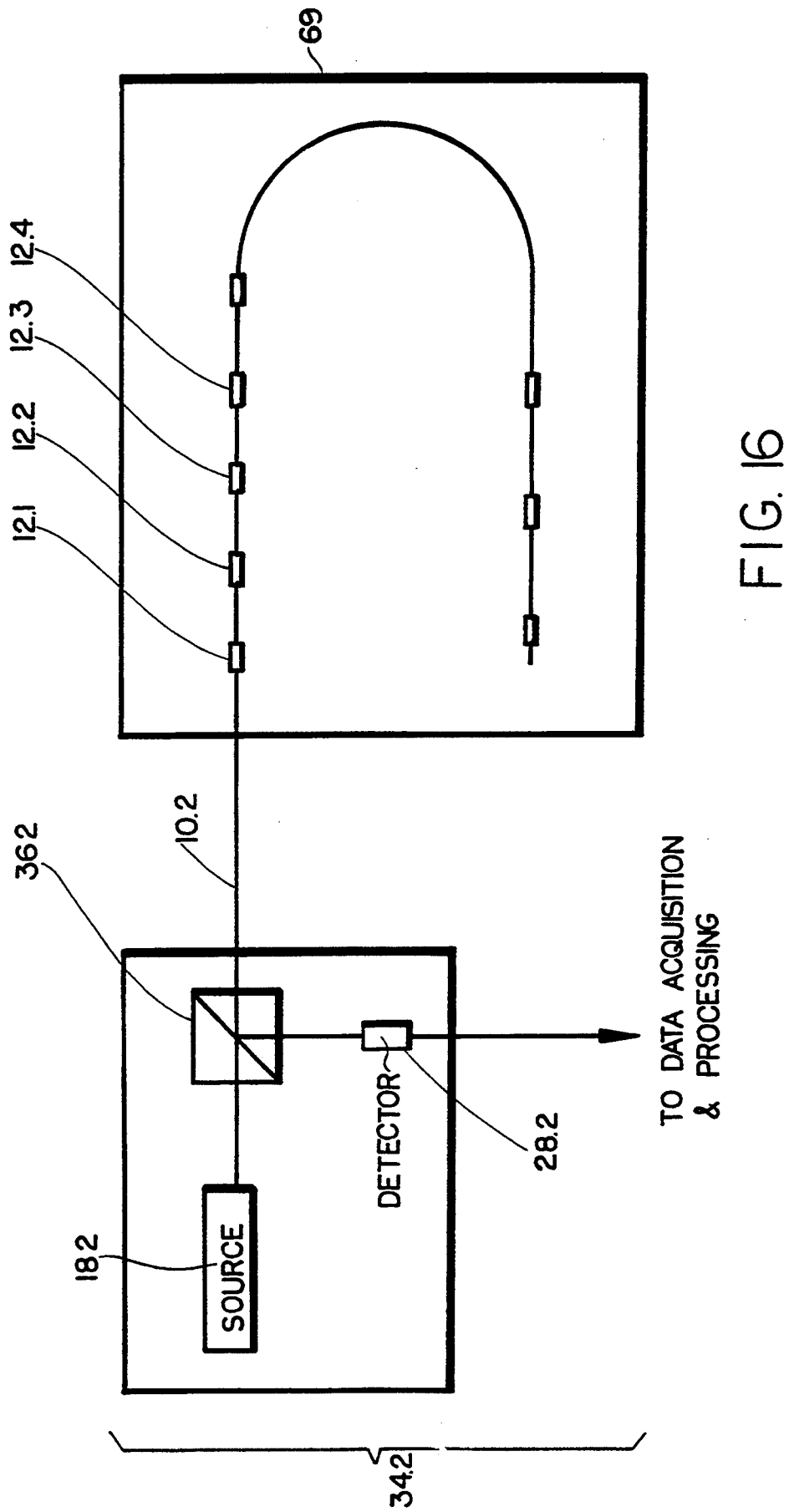
FIG. 16 shows a sensor with an optical fiber having several cavities buried in a composite material.

Of course an optic fiber can incorporate more than two cavities. FIG. 16 shows a sensor 34.2 having a fiber 10.2 with cavities 12.1, 12.2, 12.3, 12.4 and so on, a light source 18.2, a beam splitter 36.2 and a detector 28.2. The fiber 10.2 is mounted on or disposed inside an object 69 in any desired shape to provide a plurality of sensor locations from which data can be collected using the techniques and apparatus described above.

Figure 17:
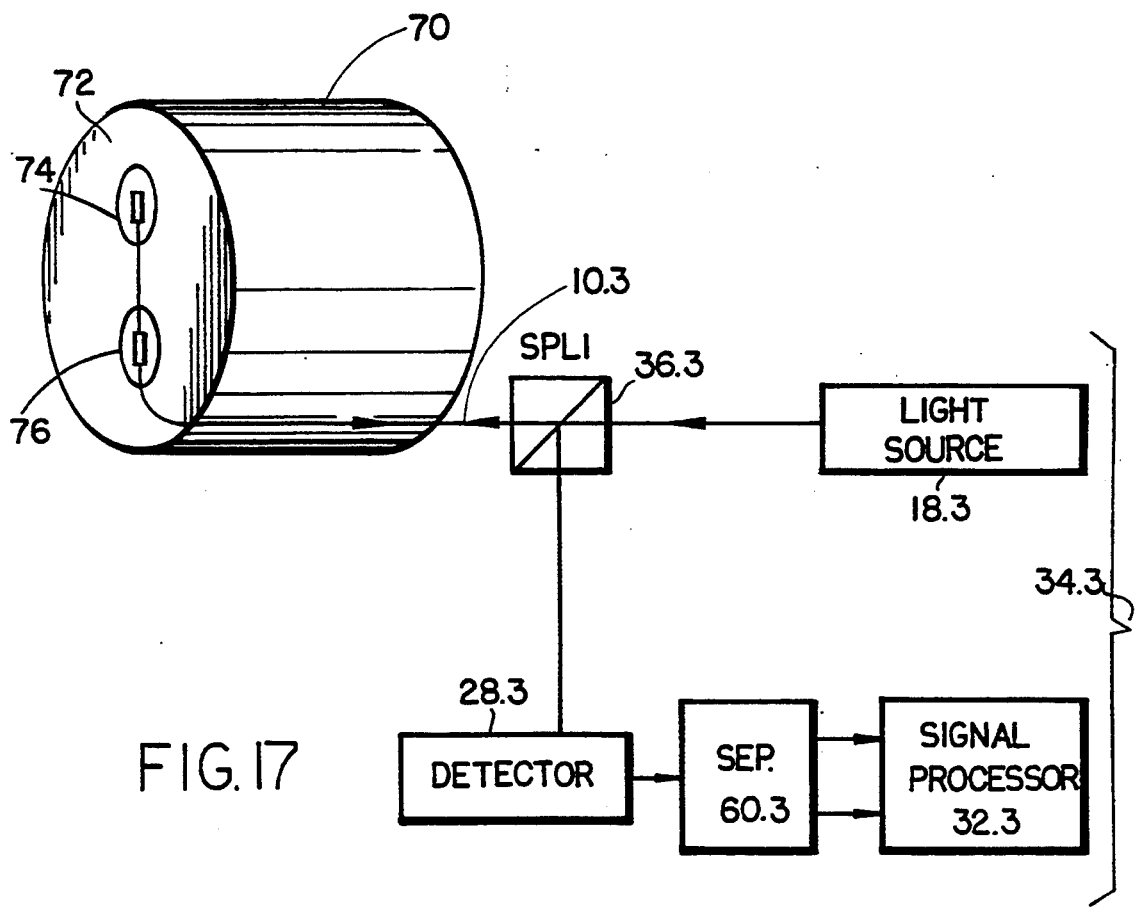
FIG. 17 shows an isometric view of a pressurized vessel monitored with the sensor of FIGS. 5 and 6.
Figure 18:
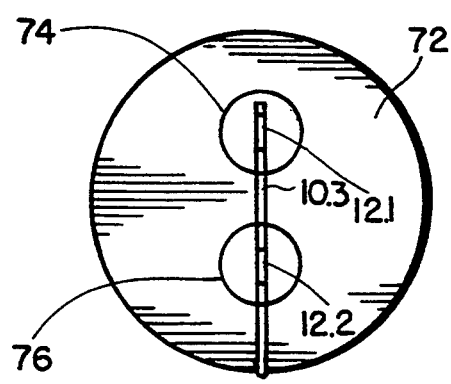
FIG. 18 shows an end view of the container with the two cavities mounted on separate membranes.

The sensor described above can be used to make not only strain measurements, but other types of measurements as well associated with strain measurements, including for example pressure and temperature. One such arrangement is shown in FIGS. 17 and 18 in which a sensor 34.3 is used to measure both the internal pressure and temperature of a cylindrical drum 70. As before, the sensor includes a fiber 10.3, a light source 18.3, a beam splitter 36.3 and a detector 28.3. Drum 70 has a flat surface 72 provided with two diaphragms 74, 76. One of the diaphragms, for example 74 is sensitive only to the internal pressure of the drum 70. The other diaphragm 76 is sensitive both to the internal pressure and temperature of drum 70. As shown more clearly in FIG. 18, fiber 10.3 is arranged so that its two FP cavities 12.1, 12,2 are secured to the diaphragms 74 and 76 respectively. The combined responses of the two FP cavities 12.1, 12.2 are picked up by detector 28.3 and transmitted to data separation system 60.3. This system 60.3 separates the responses into two signals, for analysis by signal processor 32.3. One of these signals is indicative of the internal temperature of the drum 70 while the other is indicative of both its internal temperature and pressure. The difference between these two signals is indicative of the internal pressure.

Figure 19A:
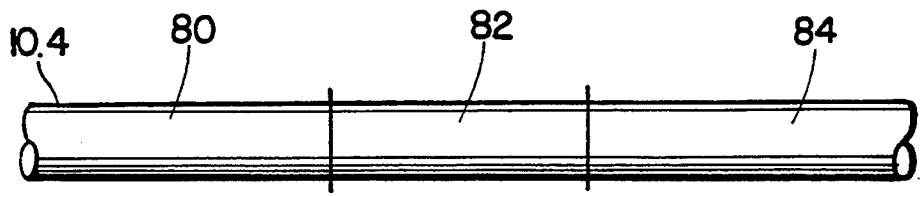
FIGS. 19A-E show one method of making and securing the sensor of FIG. 5.
Figure 19B:
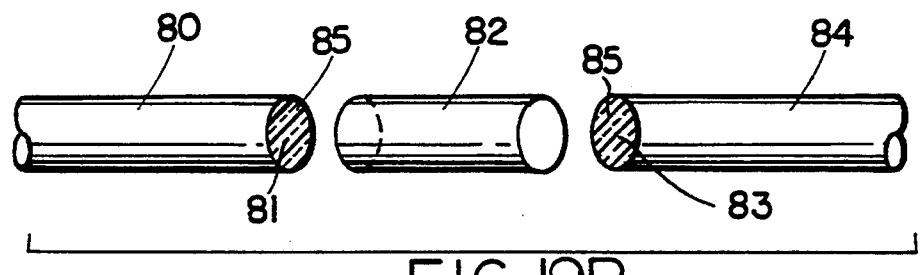
Figure 19C:
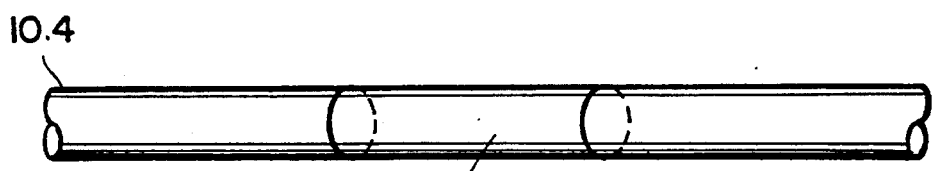
Figure 19D:
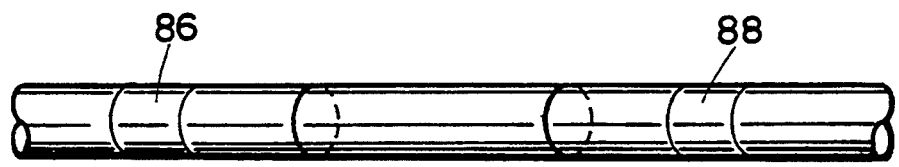
Figure 19E:
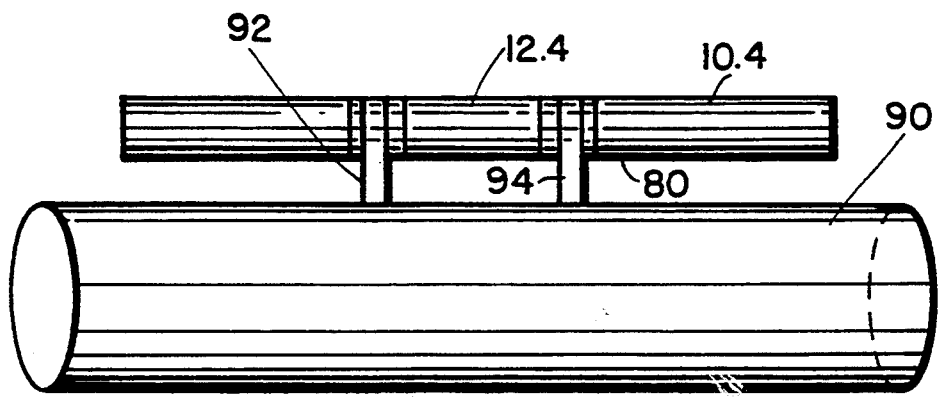

The fibers incorporating the FP cavities may frequently be used in high temperature and/or pressure environments. One method of making a fiber for this purpose is shown in FIGS. 19A–E. In these Figures, an intrinsic FP cavity is constructed as follows. Fiber 10.4 is cleaved into three sections 80, 82, and 84 (FIG. 19A). Two of the four surfaces thus created, for example surfaces 81 and 83 are coated with a partially reflecting material 85 (FIG. 19B). After the surfaces 81, 83 have been coated, the three parts 80, 82, 84 are fused back together to form a single integral unit with the coated surfaces defining the FP cavity 12.4 (FIG. 19C). Thereafter two annular rings 86, 88 made of a metallic material are deposited on the fiber 10.4, one on each side of cavity 12.4 (FIG. 19D). The fiber 10.4 can now be easily attached to a member by using the rings 86, 88 as anchoring points. For example in FIG. 19E fiber 10.4 is attached to a header 90 by welding two straps 92, 94 between rings 86, 88 and the header 90 as shown.

Figure 20A:
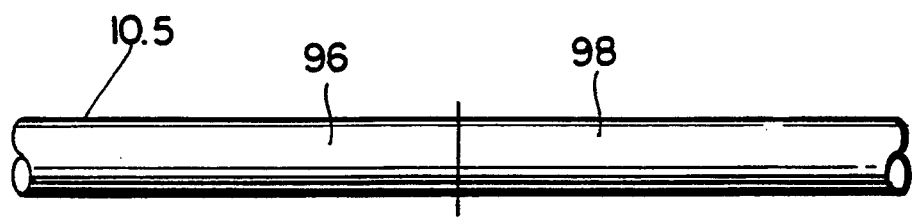
FIGS. 20A-D show another method of making and securing the sensor of FIG. 5.
Figure 20B:
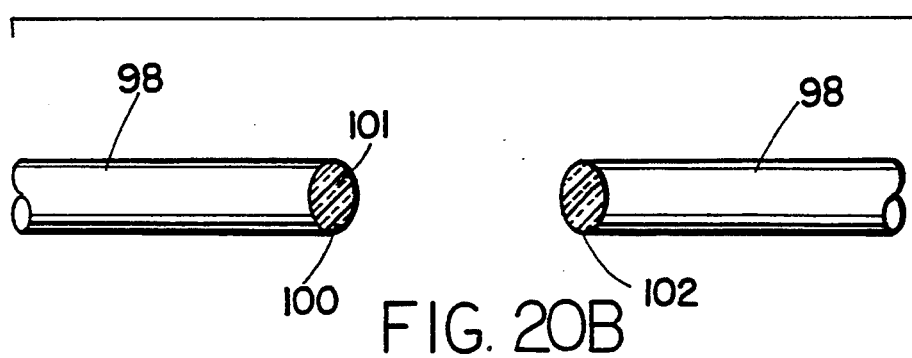
Figure 20C:
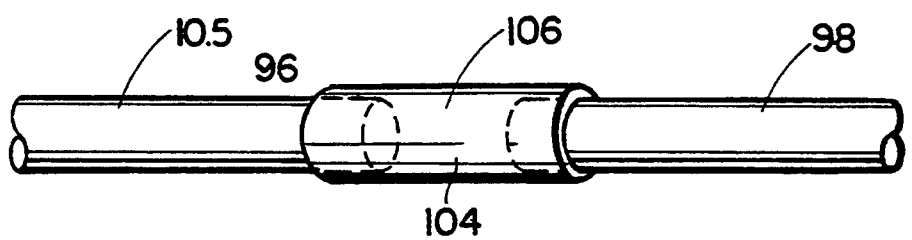
Figure 20D:
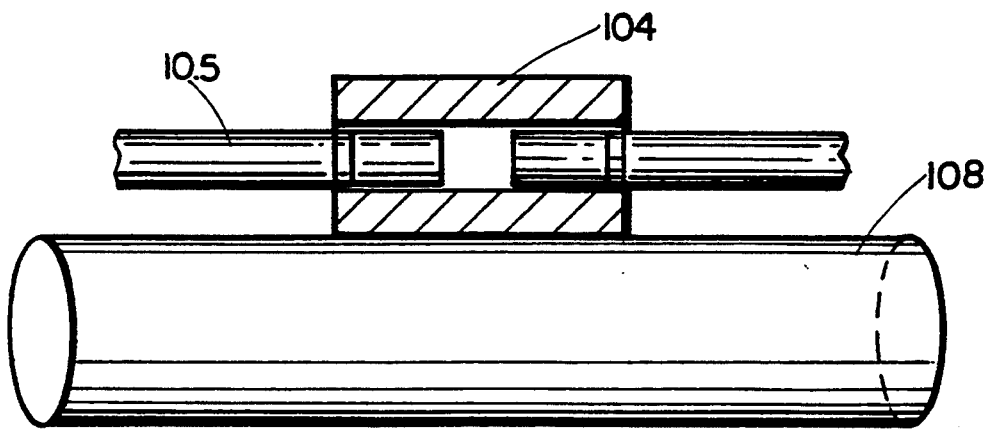

For very high temperature environments a fiber with an extrinsic cavity may be constructed as follows. As shown in FIG. 20A, first a fiber 10.5 is cleaved into two parts 96, 98. The surfaces 100, 102 thus created are coated with a reflective material 101 (FIG. 20B). The ends of the two parts 96, 98 are then inserted into a metallic or glass sleeve 104 with the coated surfaces 100, 102 being spaced at a preselected distance and separated by a gap of air 106. (FIG. 20C). In order to insure that the fiber 10.5 does not fall apart, the ends of parts 96, 98 are fused to the sleeve 106. As shown in FIG. 20D, fiber 10.5 may be secured to a header 108 by placing the fiber in parallel to the header with the sleeve 104 being in contact with the header 108 and then welding the sleeve 104 to the header 108.

Obviously numerous modifications may be made to this invention without departing from its scope as defined in the appended claims.

I claim:

1. A distributed sensor assembly for sensing physical parameters at several locations, said assembly comprising:
   an optical fiber having a longitudinal axis and a plurality of discontinuities defined by partially reflective surfaces spaced along said longitudinal axis;
   light source means for generating a monochromatic light beam of a preselected frequency through said optical fiber, said light beam being modulated into a modulated light beam at said discontinuities in accordance with a physical parameter;
   detecting means for detecting said modulated light beam; and
   separating means coupled to said detecting means for separating said modulated light beam into several components, each component including a fringe pattern of a distinct frequency and being associated with a corresponding discontinuity.

2. The assembly of claim 1 wherein said surfaces are spaced along said longitudinal axis.

3. The assembly of claim 1 wherein said surfaces define a Fabry-Perot cavity.

4. The assembly of claim 1 wherein said physical parameter is a dynamic strain.

5. A distributed optical sensor assembly comprising;
   a laser source for generating a laser beam of a preselected frequency;
   an optical fiber receiving said laser beam, said optical fiber having a longitudinal axis and including a first and a second cavity defined by partially reflective walls spaced along said longitudinal axis, said first and second cavities being arranged and constructed to generate a respective first and second component from said light beam, said first and second components including a fringe pattern of a distinct frequency and having an intensity responsive to a dynamic strain on the respective cavity; said component being combined into an output beam;
   detector means for detecting an output form said optical fiber; and
   separating means for separating said output beam into said first and second components.

6. The assembly of claim 5 wherein said characteristic parameter is a frequency.

7. The assembly of claim 5 wherein said cavities are Fabry-Perot cavities.

8. The assembly of claim 5 wherein said first cavity has at least one physical parameter different form the respective parameter of said second cavity.

9. The assembly of claim 5 wherein said first cavity is longer than said second cavity.

10. The assembly of claim 5 wherein said first cavity and second cavities are defined between respective first and second reflective walls, the walls defining said first cavity being more reflective than the walls defining said second cavity.

11. The assembly of claim 5 wherein said separating means include filters separating said components by frequency.

12. The assembly of claim 5 wherein at least one of said cavities is formed of a first reflective surface and a second reflective surface, said reflective surfaces being normal to said longitudinal axis.

13. A method of measuring several physical characteristics of an object at several locations comprising the steps of:
   securing at least a portion of an optical fiber to the object, said portion having at least two longitudinally spaced cavities defined by partially reflective surfaces, said cavities being coupled to said object;
   directing a laser beam of a preselected frequency through said fiber, said cavities generating beam components from said beam indicative of said physical characteristics, said components each having a fringe pattern of a distinctive frequency and being combined in a composite beam in said fiber;
   detecting said composing beam; and
   separating said composite beam into said components.

14. The method of claim 13 wherein said cavities have different lengths, and said components have different frequencies corresponding to said respective lengths.

15. The method of claim 14 wherein said separating step includes filtering said components by frequency.

16. The method of claim 13 wherein said cavities are defined by surfaces, the surfaces defining one of said cavities having a different reflectivity than the surfaces defining the other of said cavities.

17. The method of claim 13 wherein said physical characteristic selected from the group consisting of pressure and temperature, further comprising the step of providing a first diaphragm and a second diaphragm on said object, and wherein each of said cavities is attached to one of said diaphragms.

18. The method of claim 17 wherein said first diaphragm is substantially sensitive only to temperature.

19. The method of claim 18 wherein said second diaphragm is sensitive to both temperature and pressure.

20. The method of claim 13 wherein said optical fiber has a first fiber end and a second fiber end and wherein said laser beam is directed into said filter through said first end.

21. The method of claim 20 wherein said composite beam is detected through said first end.

22. The method of claim 20 wherein said composite beam is detected through said second end.

* * * * *